US006808260B2

(12) United States Patent
Yang

(10) Patent No.: US 6,808,260 B2
(45) Date of Patent: Oct. 26, 2004

(54) ASYMMETRICAL SUN-LENS WITH ADDED SUN BLOCK PROTECTION

(75) Inventor: Thomas Yang, Elmhurst, NY (US)

(73) Assignee: Stanley Schleger, North Hills, NY (US)

( * ) Notice: Subject to any disclaimer, the term of this patent is extended or adjusted under 35 U.S.C. 154(b) by 53 days.

(21) Appl. No.: 10/178,504

(22) Filed: Jun. 24, 2002

(65) Prior Publication Data

US 2003/0016330 A1 Jan. 23, 2003

Related U.S. Application Data

(60) Provisional application No. 60/302,243, filed on Jun. 29, 2001.

(51) Int. Cl.$^7$ .................................................. G02C 7/10
(52) U.S. Cl. .......................................... 351/44; 351/45
(58) Field of Search ............................... 351/41, 44, 45; 2/12, 13

(56) References Cited

U.S. PATENT DOCUMENTS

| 176,625 | A | * | 4/1876 | Hannay | ........................ 351/41 |
|---|---|---|---|---|---|
| 3,171,134 | A | | 3/1965 | Kennedy | ........................ 2/13 |
| D208,270 | S | * | 8/1967 | Boxer | ........................ 351/41 |
| 3,436,761 | A | | 4/1969 | Liautaud | ........................ 2/13 |
| 3,505,679 | A | | 4/1970 | Bennett | ........................ 2/13 |
| 3,577,566 | A | | 5/1971 | Kislin | ........................ 2/12 |
| 3,689,136 | A | | 9/1972 | Atamian | ........................ 351/44 |
| 4,730,915 | A | | 3/1988 | Jannard | ........................ 351/47 |
| 4,828,380 | A | * | 5/1989 | Cherian | ........................ 351/45 |
| 5,550,599 | A | | 8/1996 | Jannard | ........................ 351/159 |
| 5,560,607 | A | * | 10/1996 | Macroglou | ........................ 473/210 |
| 6,367,927 | B2 | | 4/2002 | Yang | ........................ 351/103 |

* cited by examiner

Primary Examiner—Huy Mai
(74) Attorney, Agent, or Firm—Ostrolenk, Faber, Gerb & Soffen, LLP

(57) ABSTRACT

Eyewear comprising a frame and a lens attached to the frame, the lens comprising a unitary lens for covering both eyes of a wearer, the lens including an asymmetrical portion on one side for providing additional protection for the wearer's eyes from the side of the wearer's head, the asymmetrical portion being integral with the unitary lens.

13 Claims, 2 Drawing Sheets

ASYMMETRICAL SUN-LENS WITH ADDED SUN BLOCK PROTECTION

CROSS REFERENCE TO RELATED APPLICATION

The present application claims the benefit and priority of U.S. Provisional Application Ser. No. 60/302,243 filed Jun. 29, 2001 and entitled "ASYMMETRICAL SUN-LENS WITH EXTRA COVERAGE", the entire disclosure of which is hereby incorporated by reference.

BACKGROUND OF THE INVENTION

The present invention relates to eyewear and, in particular, to sun shields. More particularly, the invention relates to eyewear for providing protection from the sun, and in particular, an asymmetrical sun lens which provides added sun protection from the side of the wearer's face. The present invention is particularly suitable for use in sports activities, for example, baseball or golf. It is also useful in any other activities where side protection from the sun is useful, e.g., other sports activities, automobile driving, etc.

The inventor is aware of the following prior art:

| Patent No. | Name | Date |
|---|---|---|
| 3,171,134 | Kennedy | Mar. 2, 1965 |
| 3,505,679 | Bennett | Apr. 14, 1970 |
| 3,436,761 | Liautaud et al. | Apr. 8, 1969 |
| 3,689,136 | Ataminan | Sep. 5, 1972 |
| 3,577,566 | Kislin | May 4, 1971 |
| 5,550,599 | Jannard | Aug. 27, 1996 |
| 4,730,915 | Jannard | Mar. 15, 1988 |
| 5,438,378 | Blatter | Aug. 1, 1995 |

U.S. Pat. No. 3,171,134 to Kennedy shows a sun-shield for eyeglasses. However, this sun shield, which has portions which wrap around the side, is symmetrical and not asymmetrical. U.S. Pat. No. 3,505,679 to Bennett shows a clip-on side shield for eyeglasses. It clips onto the eyeglass frame and one is shown for each side. It is thus both symmetrical and is not integral with the lens. U.S. Pat. No. 3,436,761 to Liautaud et al. is similar to Bennett and has a similar arrangement.

U.S. Pat. No. 3,689,136 has a shade portion which is slidable and reversible. However, that arrangement is also symmetrical.

U.S. Pat. No. 3,577,566 shows a spectacle hood which has opaque portions to exclude peripheral vision. It is particularly useful for airplane pilots.

None of the above teach or suggest a sun shield which can provide protection from the side of the wearer's face and wherein a lens is provided with an integrally formed asymmetrical portion for providing the additional protection from the sun.

SUMMARY OF THE INVENTION

The invention relates to a sun lens having an integral asymmetrical portion to provide additional coverage on one side only. For example, golfers and baseball players often have to drive or bat into the sun such that sun light comes toward the side of the head, i.e., glare comes from the side. The invention provides an asymmetrical sun lens with extra coverage to provide full protection when the sun is directed from the side. For a right handed user, the extra coverage is on the left hand side and for a left handed user the extra coverage would be on the right hand side.

The objects of the invention are achieved by eyewear comprising a frame; a lens attached to the frame, the lens comprising a unitary lens for covering both eyes of a wearer, the lens including an asymmetrical portion on one side for providing additional protection for the wearer's eyes from the side of the wearer's head, the asymmetrical portion being integral with the unitary lens.

Preferably, the lens is removable from the frame, so that the user can remove the lens and attach another lens, e.g., a symmetrical lens, when the asymmetrical lens is not needed.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which.

DETAILED DESCRIPTION

Figure 1:
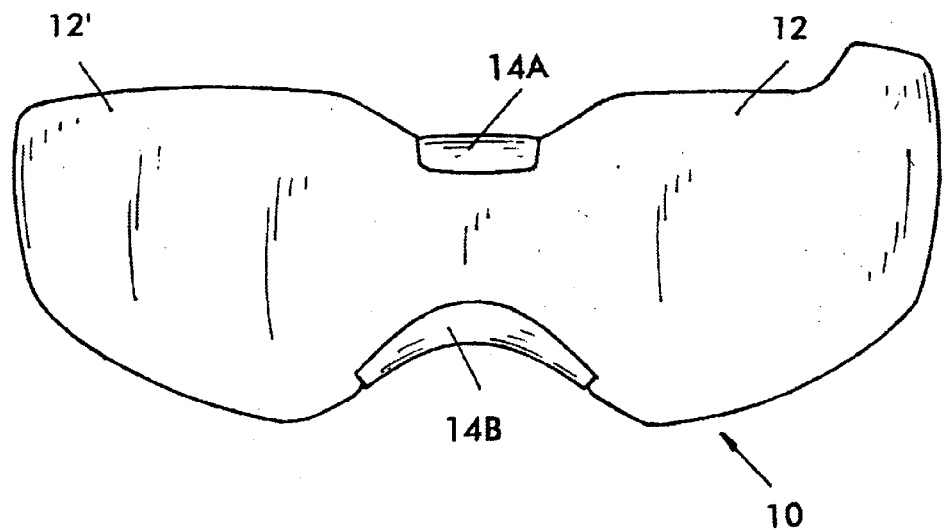
FIG. 1 shows a front view of the asymmetrical sun lens.
Figure 2:
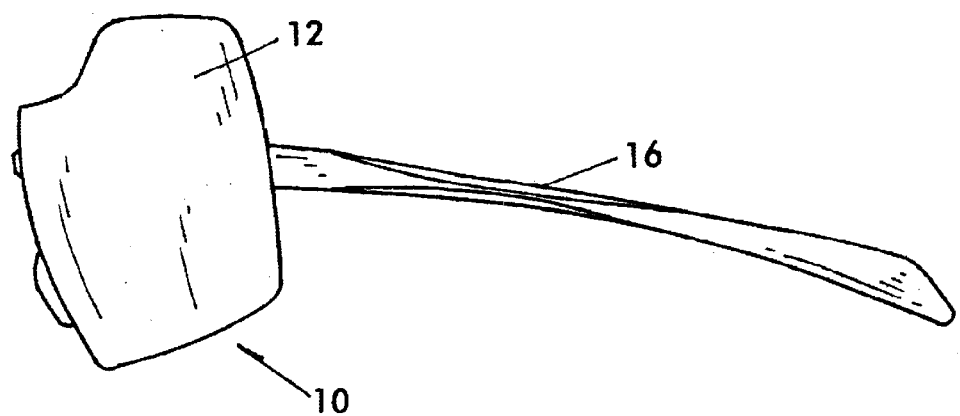
FIG. 2 shows a left hand side view of the asymmetrical sun lens of FIG. 1.

With reference now to the drawings, FIG. 1 shows a front view of an asymmetrical sun lens according to the present invention. The sun lens comprises an unitary one-piece lens 10 having a portion 12 on the left hand side for right handed persons, i.e., for right handed users such as golfers or batters, to provide protection from the sun on the left portion of the wearer's head. For a left handed person, the portion 12 would be provided on the right hand side, i.e., the side 12' opposite the asymmetrical portion 12 shown in FIG. 1 . The lens 10 is preferably a plastic lens held in position in a frame at two locations 14A, 14B as shown in FIG. 1. Temples 16 as shown in FIG. 2 would be provided, as known to those of skill in the art. Alternatively, instead of temples, an elastic band can be provided to secure the eyewear to the wearer's head.

Figure 3A:
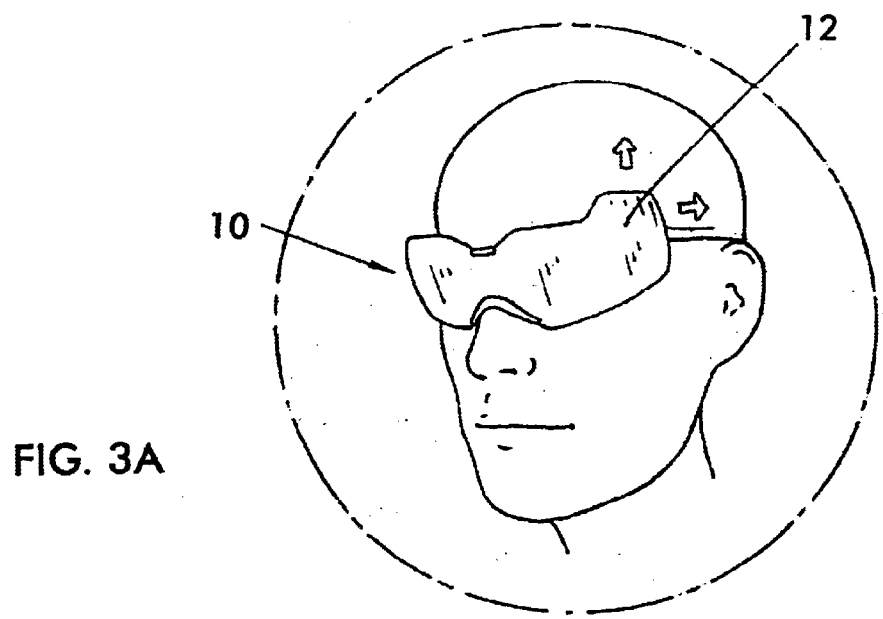
FIG. 3 shows the asymmetrical sun lens worn by a user, with FIG. 3A providing a detailed view.
Figure 3:
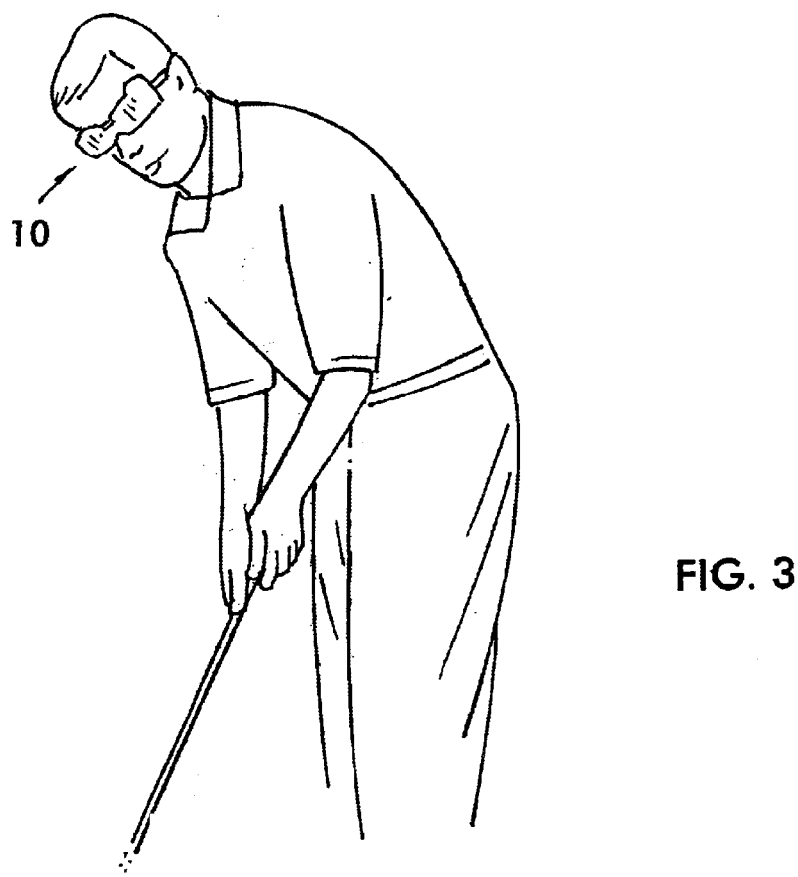

FIG. 3 shows the eyewear worn on the wearer's head. As shown, the eyewear protects, in the example of a right handed golfer or batter, the wearer's eyes from sun glare from the left side of the wearer's head i.e., it would protect the wearer's eyes from glare from the left side when the wearer is looking into the sun. For a left handed batter or golfer, the stance would be a left handed stance and the added protection 12 would be on the right side of the wearer's head.

The present invention provides advantages over standard sun glasses. Most sun glasses provide full coverage from the front side of the face only. For a golfer or baseball player (or other user), the player should optimally have full coverage on the side also. The present invention provides this additional protection. The present invention allows the player to play the game also from the side of his or her eyes. This would allow the player to have greater success playing the game. As discussed, the drawings show the invention for a right handed user in which the added protection 12 is on the left side of the lens. For a left handed user, the added coverage would be on the right side.

Preferably the lens can be removable from the frame at the mounting locations 14A, 14B by snapping the lens into position between the mounting locations 14A and 14B. The asymmetrical lens 10 can be removed from the frame and replaced by a symmetrical lens, if desired. For this purpose, the lens locking device disclosed in U.S. Pat. No. 6,367,927 can be used. To remove the lens 10 from the mounting portions 14A, 14B, the lens is flexed to remove the lens 10 from the channels disposed at the mounting portions 14A and 14B. Although the lens may be removable, it is also within the scope of the invention that the lens be permanently affixed to the eyewear frame.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Eyewear comprising:

a frame;

a lens attached to the frame, the lens comprising a unitary lens for covering both eyes of a wearer, the lens including an asymmetrical portion on one side for providing additional protection for the wearer's eyes from the side of the wearer's head, the asymmetrical portion being integral with the unitary lens; further wherein the frame comprises at least one fastening member for holding the lens; and wherein the lens is removable from the at least one fastening member.

2. The eyewear of claim 1, wherein there are at least two fastening members disposed in-line with a nose support for the eyewear.

3. The eyewear of claim 1, wherein the asymmetrical portion wraps around the side of the wearer's head.

4. The eyewear of claim 1, wherein the asymmetrical portion is provided on the left side of the wearer's head.

5. The eyewear of claim 1, wherein the asymmetrical portion is provided on the right side of the wearer's head.

6. The eyewear of claim 1, wherein the lens is permanently affixed to the frame.

7. Eyewear comprising:

a frame; and a plurality of detachable lenses, at least one of said lenses comprising a unitary lens for covering both eyes of a wearer, the at least one lens including an asymmetrical portion on one side for providing additional protection for the weare's eyes from the side of the weare's head, the asymmetrical portion being integral with the unitary lens; at least a second of said lenses comprising a symmetrical unitary lens for covering both eyes of the wearer;

the frame including at least one fastening member for allowing removable attachment of a selected one of the plurality of lenses.

8. The eyewear of claim 7, wherein the frame comprises at least one fastening member for the selected lens.

9. The eyewear of claim 8, wherein the frame comprises at least two fastening members for the selected lens.

10. The eyewear of claim 9, wherein the fastening members are disposed in-line with a nose support for the eyewear.

11. The eyewear of claim 7, wherein the asymmetrical portion wraps around the side of the wearer's head.

12. The eyewear of claim 9, wherein the asymmetrical portion is provided on the left side of the wearer's head.

13. The eyewear of claim 7, wherein the asymmetrical portion wraps around the side of the wearer's head.

* * * * *